(12) United States Patent
V et al.

(10) Patent No.: US 10,298,654 B2
(45) Date of Patent: May 21, 2019

(54) AUTOMATIC UNIFORM RESOURCE LOCATOR CONSTRUCTION

(71) Applicant: Adobe Inc., San Jose, CA (US)

(72) Inventors: Smitha V, Bangalore (IN); Mohit Garg, New Delhi (IN); Ankur Jain, Uttar Pradesh (IN); Frank Jennings, Bangalore (IN)

(73) Assignee: Adobe Inc., San Jose, CA (US)

( * ) Notice: Subject to any disclaimer, the term of this patent is extended or adjusted under 35 U.S.C. 154(b) by 583 days.

(21) Appl. No.: 14/206,277

(22) Filed: Mar. 12, 2014

(65) Prior Publication Data

US 2015/0264105 A1    Sep. 17, 2015

(51) Int. Cl.
   *H04L 29/08*    (2006.01)
(52) U.S. Cl.
   CPC .................................... *H04L 67/02* (2013.01)
(58) Field of Classification Search
   CPC ........................... H04L 67/02; G06F 17/30887
   USPC ......................................................... 709/201
   See application file for complete search history.

(56) References Cited

U.S. PATENT DOCUMENTS

| | | | | |
|---|---|---|---|---|
| 8,341,529 B1* | 12/2012 | Li | ..................... | G06F 17/30861 715/741 |
| 2007/0288514 A1* | 12/2007 | Reitter | .............. | G06F 17/30864 |
| 2011/0264992 A1* | 10/2011 | Vishria | ............. | G06F 17/30887 715/208 |
| 2011/0295936 A1* | 12/2011 | Gill | ................... | G06F 17/30873 709/203 |
| 2013/0018944 A1* | 1/2013 | Shyamsunder | ... | G06F 17/30876 709/203 |
| 2014/0143331 A1* | 5/2014 | Smith | ................. | G06F 17/2795 709/204 |
| 2014/0143337 A1* | 5/2014 | McIntosh | ................ | H04L 67/02 709/204 |
| 2014/0278939 A1* | 9/2014 | Hotta | ................. | G06Q 30/0246 705/14.45 |
| 2015/0178476 A1* | 6/2015 | Horton | .................. | G06F 17/214 726/26 |

* cited by examiner

*Primary Examiner* — Joseph L Greene
(74) *Attorney, Agent, or Firm* — Finch & Maloney PLLC

(57) ABSTRACT

Techniques are disclosed for automatically constructing a human-friendly and meaningful URL based on the content, context, or both, of the resource. An alternate URL can be constructed by analyzing and extracting keywords or other portions of content from a webpage automatically. The content of the webpage or other resource is obtained and analyzed using keyword extraction filters to derive one or more keywords that uniquely represent the content of the resource. An alternate URL is constructed based on the keywords. The keywords can be extracted from any portion of the content or from dictionary definitions or similar meanings of the content. The alternate URL is constructed such that it is unique among existing URLs. The alternate URL meaningfully represents the content, permitting the user to use or share the alternate URL on social media and elsewhere.

20 Claims, 8 Drawing Sheets http://www.thehindu.com/todays-paper/tp-features/tp-fridayreview/bestowing-a-divine-touch/article1610131.ece

FIG. 2 http://bit.ly/1bZ6Y0S
http://goo.gl/cI75CV

FIG. 3 http://sho.rt/BestowingADivineTouchTheHindu

FIG. 4a http://www.thehindu.com/todays-paper/tp-features/tp-fridayreview/bestowing-a-divine-touch/article1610131.ece

FIG. 7 http://sho.rt/BestowingADivineTouchTheHindu

FIG. 8

AUTOMATIC UNIFORM RESOURCE LOCATOR CONSTRUCTION

FIELD OF THE DISCLOSURE

This disclosure relates to the field of data processing, and more particularly, to techniques for automatically constructing an alternate uniform resource locator from the contents of a webpage or other electronic resource.

BACKGROUND

A uniform resource locator (URL) is a widely recognized syntax for describing the location of an electronic resource, such as a webpage, data file, or service. A URL is similar to a postal address or telephone number in that it refers to a particular resource using a sequence of letters, digits, special characters, or any combination of these. For instance, using a Hypertext Transfer Protocol (HTTP) scheme, the format of a URL includes either the physical IP address or domain name of a host computing system, and a path to a resource provisioned by the host, such as "http://www.example.com/home/index.html." The path generally follows a structured file naming convention used by the host (e.g., "/home/index.htm"). In some cases, descriptive attributes may be appended to the path (e.g., "/home/index.htm#summary"). It is possible for some URLs to become very long, complex, and aesthetically unpleasing. Such so-called long URLs can be difficult to read, remember, type out, and share with others. Further, some long URLs are not usable in services that have character limits, such as Twitter®.

BRIEF DESCRIPTION OF THE DRAWINGS

The accompanying drawings are not intended to be drawn to scale. In the drawings, each identical or nearly identical component that is illustrated in various figures is represented by a like numeral.

FIG. 2 shows an example of a long URL.

FIG. 3 shows two examples of short URLs generated using an existing URL shortening technique.

FIG. 4a shows an example alternate URL constructed in accordance with an embodiment of the present invention.

FIG. 7 shows the example long URL of FIG. 2 with portions highlighted.

FIG. 8 shows the example alternate URL of FIG. 4 with portions highlighted.

DETAILED DESCRIPTION

Figure 1A:
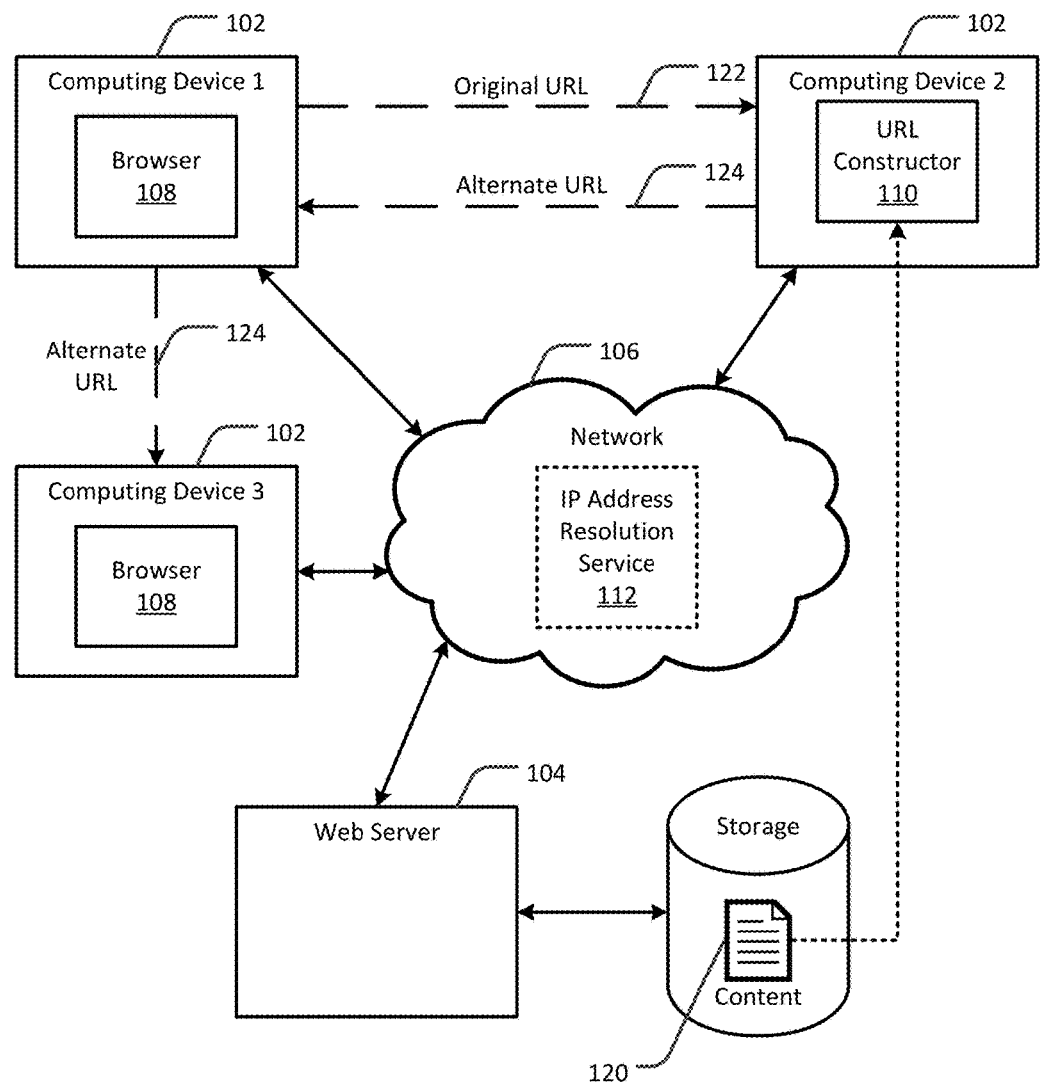
FIGS. 1a and 1b each illustrate an example client-server system for automatically constructing a uniform resource locator (URL), in accordance with an embodiment of the present invention.

A long URL can be converted into a shorter URL, which may be easier to use. A redirection service intercepts the short URL and redirects the user to the correct destination. Existing URL shortening techniques mechanically replace long URLs with shorter, randomly generated character sequences. However, URLs shortened in this manner include alphanumeric character patterns that are meaningless to a human (e.g., "http://sho.rt/7uZ494M"). Therefore, in terms of friendliness and meaning, such short URLs can be as impractical as the corresponding long URLs, if not more so. Other existing URL shortening techniques allow users to manually specify the keywords they want to incorporate into the shortened URL. However, such keywords are likely to reflect the subjectivity of the person creating the URL, and do not necessarily convey to other users a useful meaning about the content and source of the referenced webpage (e.g., "http://sho.rt/todaysnews"). As will be appreciated in light of the present disclosure, the ability to automatically construct a meaningful URL based on the page contents and metadata can be beneficial for setting up a link routing system that converts long, meaningless URLs to friendly and meaningful alternate URLs with little or no human intervention. Such alternate URLs may, for example, be saved into a user's so-called favorites section of his/her browser application, shared via electronic communications (e.g., emails, texts, etc), and used in social networking websites, emails, electronic text messages, and other environments where links are shared between users.

To this end, and in accordance with an embodiment of the present invention, techniques are disclosed for automatically constructing a human-friendly and meaningful URL based on the content, context, or both, of an electronic resource. In a specific example embodiment, a link re-writing methodology can be used to construct an alternate URL by automatically analyzing and extracting keywords or other data from the contents of a Webpage. In this methodology, a user submits an original URL (e.g., a direct link to a webpage or other resource) for conversion into an alternate URL. Next, the content of the Webpage referred to by the original URL is obtained. The content is analyzed and parsed using keyword extraction filters to derive one or more keywords that represent the nature of the resource. The alternate URL, which can be used to refer to the same resource as the original URL, is constructed based on the keywords using one of several techniques, examples of which are provided in further detail below. The keywords can be extracted from any portion of the content (e.g., HTML headers, metadata, or body text) or formed from dictionary definitions, synonyms, or similar meanings of words used on the Webpage. The composition of the alternate URL depends on which construction technique is used, so that different techniques can yield different alternate URLs. To avoid conflicts, the alternate URL is constructed such that it is unique among existing URLs. For example, the alternate URL may be considered unique if it is different from any URL registered with a Domain Name System (DNS) directory service. In the event that a particular alternate URL is not unique, another construction technique can be used to obtain a unique alternate URL. Once constructed, the alternate URL is a meaningful representation of the resource, permitting the user to, for example, use or share the alternate URL on social media, in emails and electronic text messages, and elsewhere. Numerous configurations and variations will be apparent in light of this disclosure.

As used herein, the term "resource," in addition to its plain and ordinary meaning, includes, but is not limited to, anything or any entity that can be identified, named, addressed, accessed, or otherwise handled in any networked information system, such as the World Wide Web. Some specific examples of resources include electronic documents, files, webpages, images, objects, services, collections of resources, or generally anything that has an identity and can be referenced in some manner. Some resources can be accessed or otherwise referenced using a type of uniform resource identifier (URI), such as a URL, although it will be understood that the embodiments variously described herein are not limited to using such addressing schemes.

As used herein, the terms "content" and "web content," in addition to their plain and ordinary meanings, include text, data, graphics, music, podcasts, videos, photos, or any other form of information that is provided by a resource.

Example System

FIG. 1a illustrates an example client-server system 100 for automatically constructing an alternate URL 124 from the contents of a webpage or other electronic resource, in accordance with an embodiment. The system 100 includes one or more computing devices (e.g., indicated as Computing Devices 1, 2, and 3) 102 and a web server 104, each electronically interconnected via a network 106 (e.g., a wide area network, such as the Internet, or a local area network). Generally, the computing devices 102 can be any type of device, such as a PC, tablet, or smart phone, configured to access and use content 120 (e.g., a webpage) provisioned by the web server 104 and referenced by an original URL 122. It will be understood that the functions of the computing devices 102 variously described in this disclosure can be performed on and by any number of computing devices, depending on the particular application of the system. For instance, one or more of the computing devices 102 (e.g., Computing Devices 1 and 3) include a browser 108 or other application suitable for retrieving, processing, displaying and interacting with the content. The same or a different computing device 102 (e.g., Computing Device 2) includes a URL constructor module 110 configured to generate the alternate URL 124. The network 106 provides an IP address resolution service 112 for translating the domain name in a URL, such as those using the Domain Name System (DNS), into a physical IP address of a device connected to the network 106.

Figure 1B:
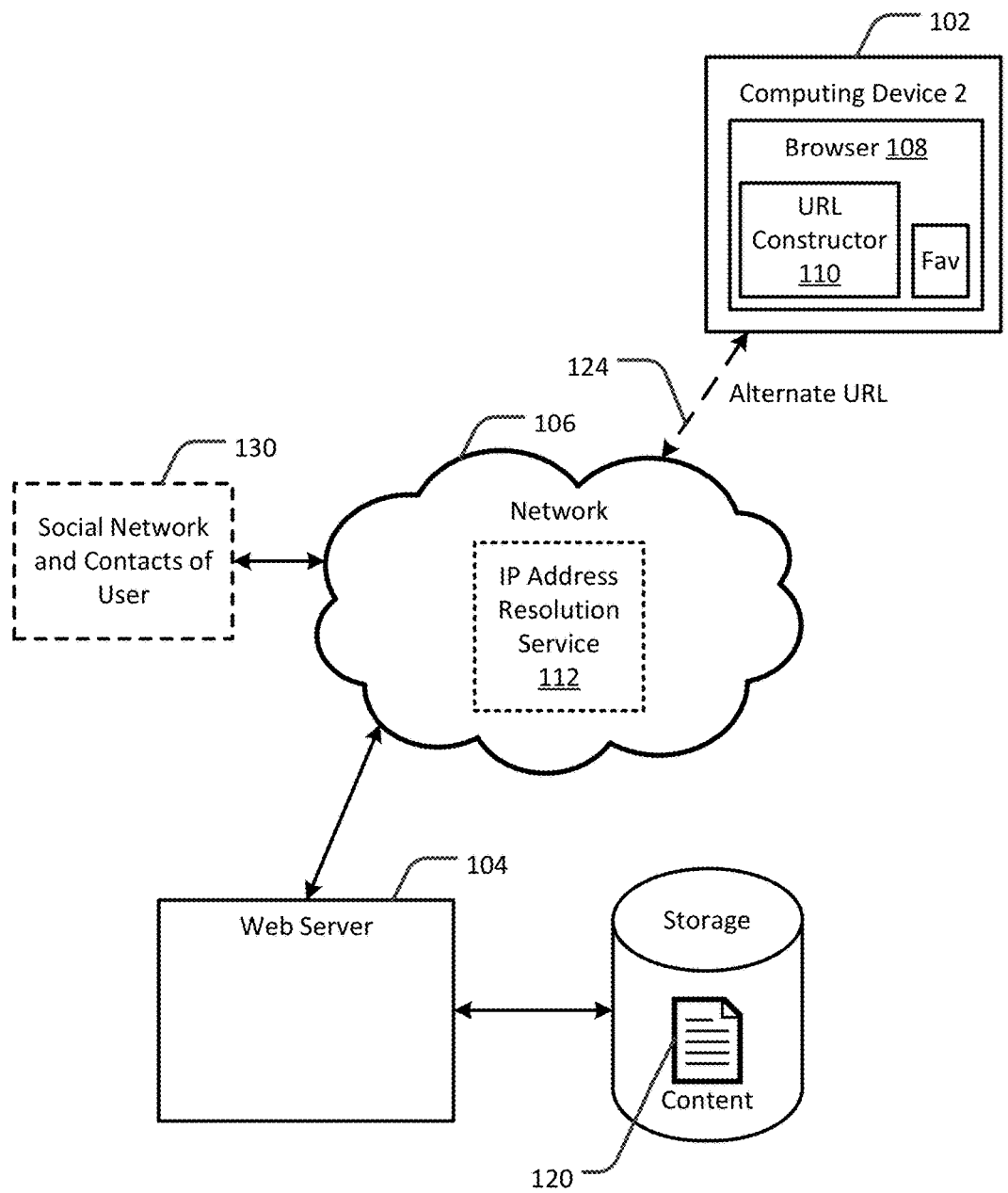

As will be appreciated in light of this disclosure, and as alluded to above, note that the techniques provided herein for automatically constructing an alternate URL can be implemented in the context of a single computing system 102, such as shown in FIG. 1b. In this example case, Computing Device 2 includes a URL constructor module 110 integrated with the browser application 108 and configured to generate the alternate URL 124. The URL constructor module 110 can be embodied in various forms, for example, in the form of an application installed on a mobile phone, in the form of a plugin, in the form of a web service, in the form of a service integrated with a product service, in the form of a desktop application, in the form of a headless component (e.g., without a user interface), or in any other form to generate the alternate URL 124. The Computing Device 2 can then use the alternate URL 124 in a number of ways. For instance, Computing Device 2 can save the alternate URL 124 using a favorites function (Fav) of the browser application 108 for future reference and access. Alternatively, or in addition to, Computing Device 2 can share the alternative URL 124 with various contacts 130 (e.g., business colleagues, friends, etc) via the network 106. The alternate URL 124 may be shared, for instance, by emailing, texting, or other suitable communication applications. Likewise, the alternate URL 124 may be shared by posting it to a social networking website or blog or other public or private forum accessible via the network. In some embodiments, the URL constructor module 110 may reside in the source application, (e.g., the application from or through which the original URL is obtained, such as the browser application 108 of Computing Device 1), or in the destination application (e.g., the application in which the alternate URL is pasted or otherwise used, such as the browser application 108 of Computing Device 2). For example, if the URL constructor module 110 resides in the destination application, then the module 110 may load the webpage referenced by the original URL in headless way (e.g., without a user interface) and generate the alternate URL 124. In some cases, the URL constructor module 110 may be integrated into an extensible application, such as Microsoft Word®, and activated through an interface of the application (e.g., the Paste Special menu item).

Numerous applications for the alternate URL construction process will be apparent in light of this disclosure. For instance, in one example embodiment, an original URL can be shared with another user via email or a social media service (e.g., Adobe® Social, Facebook®, Twitter®, LinkedIn®, YouTube®, Foursquare™, etc.). A user copies the original URL from, for example, the address bar of a browser application, an email, a blog, a social media post, a forum post, or other source. While copying, an option can be provided to the user for selecting an alternate URL to share. Alternatively, the alternate URL can be selected by default if a setting indicating so is detected. When the user pastes the original URL in any other application (e.g., an email application, a browser application, a mobile device application, etc.), then the alternate URL is pasted instead of the original URL. In some cases, an option to paste any one of the alternate URL or the original URL can also be available to the user. In another example embodiment, the favorites function of a browser application can be programmed or otherwise configured to automatically invoke or otherwise request the URL constructor module to generate an alternate URL when the user selects the "add to favorites" user interface control feature of the browser. In another example embodiment, a search engine server can be programmed or otherwise configured to automatically invoke or otherwise request the URL constructor module to generate an alternate URL for each of the search results that is generated in response to a user's search query. The search results can then be presented to the user using the alternate URLs. In some such embodiments, snippets of the content associated with the alternate URL can be displayed along with the alternate URL. In yet another example embodiment, a content service (e.g., a news website, a blog website, a photo sharing service, a video sharing service, etc.) can be programmed or otherwise configured to automatically invoke or otherwise request the URL constructor module to generate an alternate URL referencing content added, modified or otherwise accessed by the user. For example, when a user uploads a photo to a photo sharing website, the photo sharing website may automatically generate an alternate URL referencing the uploaded photo based on metadata associated with the photo (e.g., location, time and date, description, or any other information associated with the photo). This alternate URL may then be used by the user to access the photo, or shared with other users.

FIG. 2 shows an example of an original URL 200 that references a particular resource (e.g., a webpage). As can be seen, the original URL 200 is relatively long, can span more than one printed line, and, in any event, is difficult to decipher since it contains the names of many subdirectories in addition to a file name.

FIG. 3 shows two examples of short URLs 300 generated using an existing URL shortening technique. As can be seen in these examples, each of the short URLs 300 includes an indecipherable pattern of characters: "lbZ6Y0S" and "cl75CV", respectively. These short URLs 300 are meaningless to a human and do not convey any information about the resource they reference. Without further understanding, a user looking at these short URLs will not know anything about the content, making it more likely that a cautious user will ignore or delete the short URL to avoid the risk of being redirected to a webpage that is unfamiliar and potentially contains malicious software. Further, these short URLs 300 are unmemorable, and because of their cryptic nature a user is more likely to mistype these short URLs 300 when manually entering them into the browser.

Figure 4B:
FIG. 4b shows a screenshot of an example webpage referenced by a URL.

FIG. 4a shows an example alternate URL 400 constructed in accordance with an embodiment. The example alternate URL 400 contains a short domain name, which can be recognized by the IP address resolution service of FIGS. 1a-b. The example alternate URL 400 further contains a string of characters that can be interpreted by a human: "BestowingADevineTouchTheHindu." This example alternate URL 400 contains a concatenation of keywords found in the content (e.g., "Bestowing a Device Touch") and the domain name of the server providing the content (e.g., "The Hindu"), which are extracted from the content of the corresponding example webpage, an portion of which is depicted in FIG. 4b. As discussed below, the alternate URL can be constructed in several different ways. A user reading the alternate URL can extract meaning from it (e.g., the name of the article and its source). Further, since the example alternate URL possesses a sequence of meaningful words, the user is more likely to remember the alternate URL and to correctly type it into the browser. Additionally, another user seeing the example alternate URL for the first time may, without obtaining additional information, easily understand what the alternate URL refers to.

Example Methodologies

Figure 5:
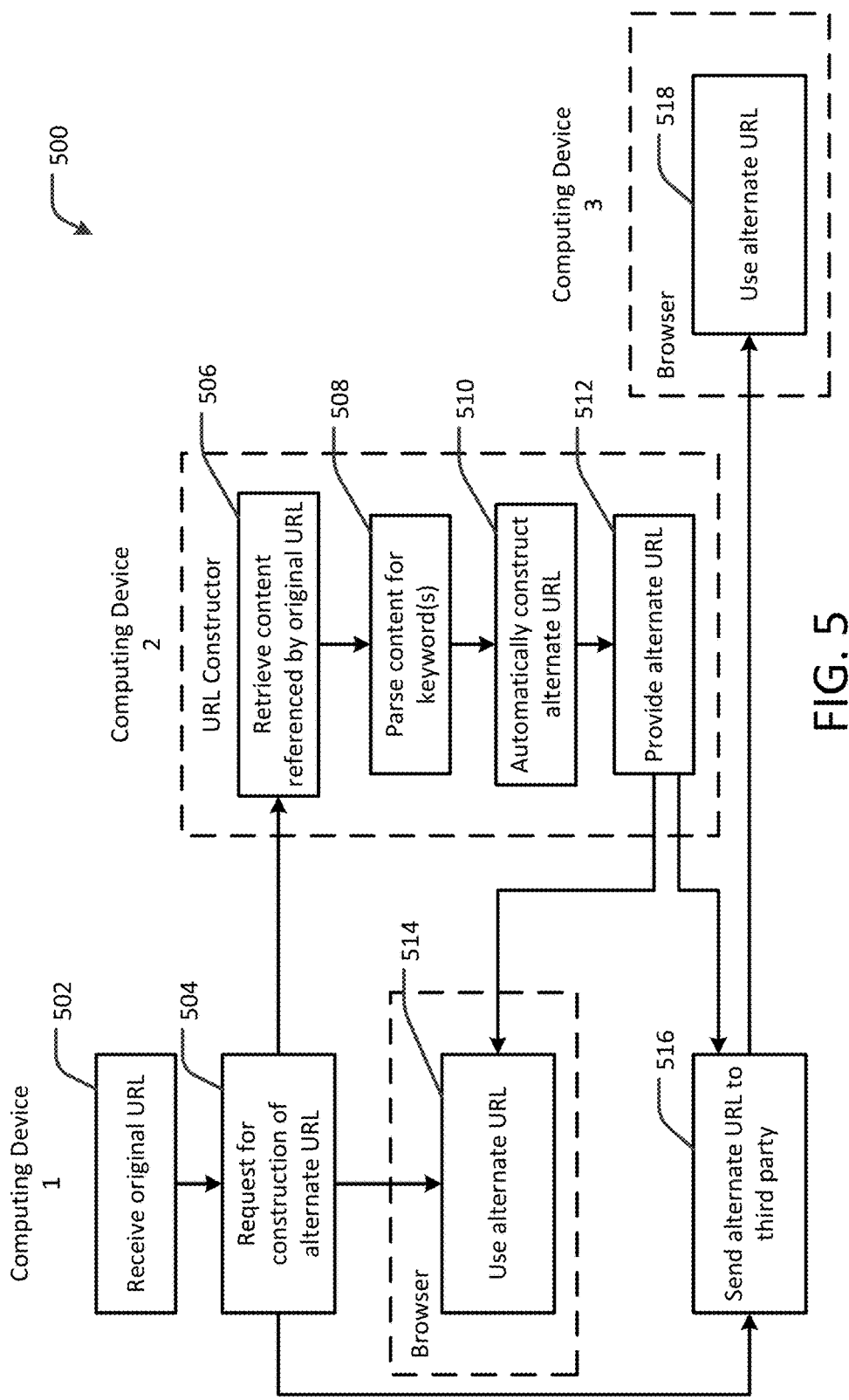
FIG. 5 is a flow diagram of an example URL construction methodology, in accordance with an embodiment of the present invention.

FIG. 5 is a flow diagram of an example URL construction methodology 500, in accordance with an embodiment. In use, a user using Computing Device 1 receives or otherwise obtains an original URL (502). The Computing Device 1 then sends a request for construction of an alternate URL (504) to a URL constructor module, which can execute on Computing Device 2 (or any other computing device, including Computing Device 1). The URL constructor module retrieves the content from the resource referenced by the original URL (506). The URL constructor module then parses the content for one or more keywords (508), and automatically constructs an alternate URL based on the keywords (510). Several example techniques for constructing the alternate URL are shown and described below with respect to FIGS. 5 and 6. The URL constructor module then provides, returns or otherwise presents the alternate URL (512). Note that in some cases the alternate URL can be requested and generated by the same computing system (e.g., by Computing Device 2) and in other cases the alternate URL can be requested on one computing system (by Computing Device 1) and generated by another computing system (e.g., by Computing Device 2) and then forwarded to the requesting system. In this sense, the request that initiates or otherwise triggers the URL construction process may be made locally or remotely. In a similar fashion, the alternate URL resulting from the URL construction process can be used locally or remotely, as the case may be. The alternate URL references the same resource as the original URL, and can utilize the same or a similar protocol as the original URL (e.g., HTTP, HTTPS, FTP, etc.). The alternate URL may, for example, be shorter, friendlier to use, and more meaningful to the user than the original URL, such as with the example shown and described with respect to FIG. 4a. The user can use the alternate URL to access the resource (514) (e.g., on the browser of Computing Device 1). Additionally or alternatively, the user may share the alternate URL with another user (516) so that the other user can access the same resource (518) (e.g., on the browser of Computing Device 3).

Figure 6:
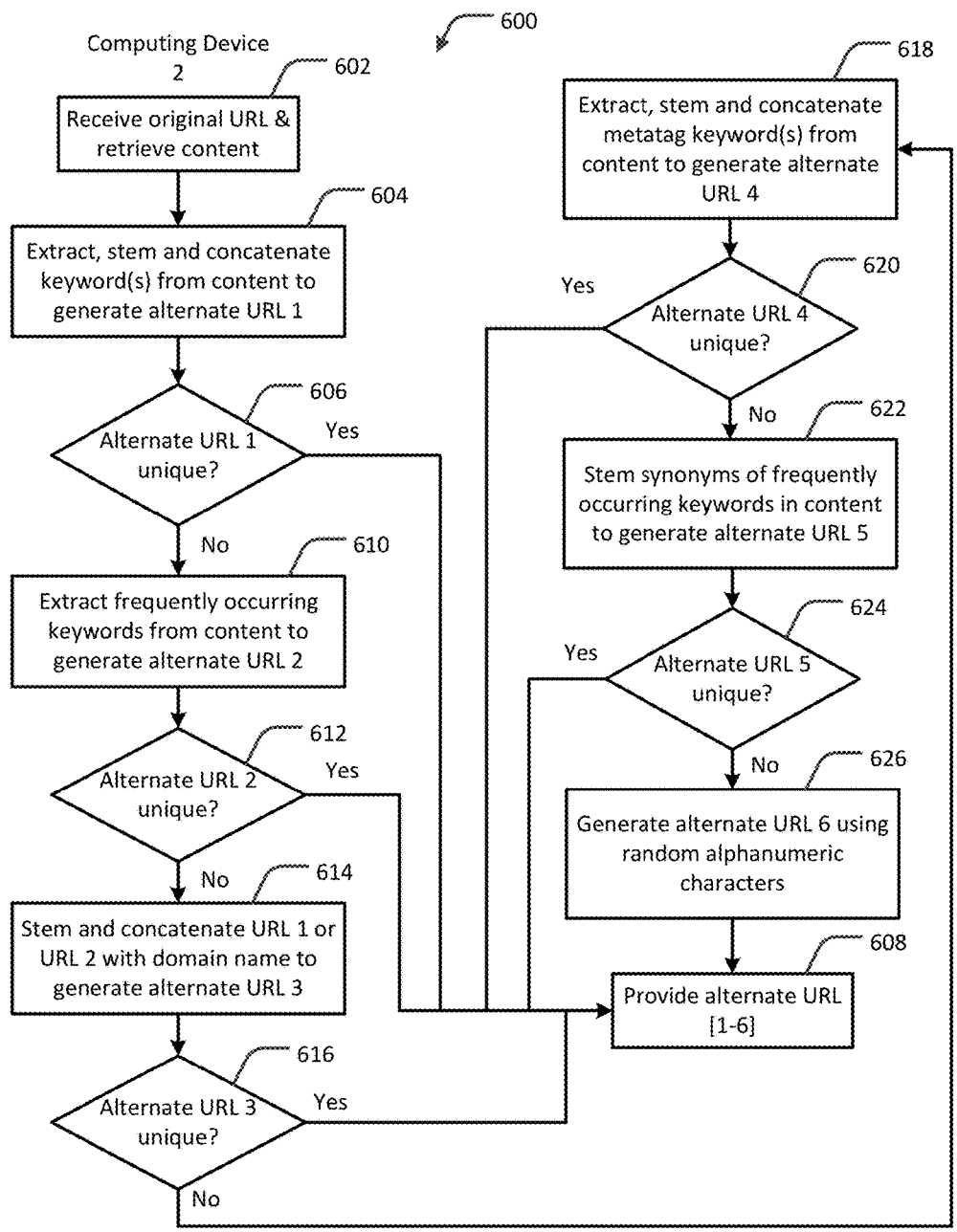
FIG. 6 is a flow diagram of another example URL construction methodology, in accordance with an embodiment of the present invention.

FIG. 6 is a flow diagram of another example URL construction methodology 600, in accordance with an embodiment. The method 600 can be performed, at least in part, by the URL constructor module of FIGS. 1a-b. The method begins by receiving an original URL and retrieving content from the resource referenced by the original URL (602). The method continues by extracting keywords from the HTML headers of the content (604). Every HTML webpage includes an HTML header. The HTML header may include one or more keywords. For example, the <title> tag of the HTML header contains the title of the page. This title is most often the best sentence describing the content of the page. For example, the <title> tag may contain "Bestowing a divine touch—the Hindu," such as depicted in the example webpage of FIG. 4b. The keywords can be extracted from the HTML header using any existing technology. The keywords are then stemmed. For example, stemming may include using a portion of the keyword in a root form to which affixes can be attached, such as "friend" for "friends" or "friendship." The stemmed keywords are then concatenated to form an alternate URL 1. For example, the alternate URL 1 may be constructed in the general form "http://<keyword_phrase>," where keyword_phrase includes the stemmed keywords. One example alternate URL is "http://sho.rt/BestowingADivineTouchTheHindu." Any existing technology can be used for stemming and concatenating. The method continues by comparing the alternate URL 1 to existing URLs (606). The existing URLs may, for example, include any URL that is registered with a DNS directory service or otherwise stored in a directory or listing of URLs previously generated by any service or technique. The comparison may be performed, for example, using any existing directory lookup service (e.g., an authoritative DNS name server) to obtain or search for existing URLs that match alternate URL 1. If the alternate URL 1 is unique (e.g., no other existing URL is identical), the alternate URL 1 is returned or otherwise presented to the user (608).

If the alternate URL 1 is not unique or if the HTML header does not include any keyword, the method continues by counting the frequency of words found in the content and extracting the most frequently recurring words (610) (e.g., the top five most frequently occurring words used on the webpage). For example, the most frequently used words may include "Sanjay," "Raga," "Concert," "Kriti," and "Melody." These keywords may describe the web page better than the existing HTTP URL. The most frequently recurring words can be stemmed and concatenated to form an alternate URL 2. One example alternate URL is "http://sho.rt/SanjayRagaConcertKritiMelody." The alternate URL 2 is compared to existing URLs (612). If the alternate URL 2 is unique, the alternate URL 2 is returned or otherwise presented to the user (608).

If the alternate URL 2 is not unique, the method continues by concatenating alternate URL 1, alternate URL 2, or both, with at least a portion of the domain name (e.g., "thehindu.com" without the leading "www", or any other formulation of the domain name) of the original URL to form an alternate URL 3 (614). The domain name may be obtained, for example, by extracting the domain name from the original URL using any existing technique. Continuing the above example, in this case the alternate URL can be "http://ado.be/SanjayRagaConcertKritiMelodyTheHindu." The alternate URL 3 is compared to existing URLs (616). If the alternate URL 3 is unique, the alternate URL 3 is returned or otherwise presented to the user (608). Another example of this technique is shown in FIGS. 7 and 8, where the stemmed keywords "BestowingADivineTouch" and "TheHindu" (depicted in the underlined portions of URL 700) are extracted from the content and domain name and concatenated to form the alternate URL 3 (800). In another example, the <title> tag of the HTML code in the webpage contains the title of the page. This title is most often the best sentence describing the content of the webpage. If, for example, the <title> tag contains "Bestowing a divine touch—the Hindu," the alternate URL of FIG. 8 can be constructed based on this tag.

Referring again to FIG. 6, if the alternate URL 3 is not unique, the method continues by extracting keywords from metadata associated with the content. The metadata can include any data that is associated with the content, whether visible to a user or not, such as metadata or source code associated with an HTML document. For example, a webpage may include metadata specifying what language it is written in, what tools were used to create it, where to go for more information on the subject, keywords for search engines, etc., which allow browsers to automatically improve the experience of users. The keywords can then be stemmed and concatenated to form an alternate URL 4 (618). The alternate URL 4 is compared to existing URLs (620). If the alternate URL 4 is unique, the alternate URL 4 is returned or otherwise presented to the user (608).

If the alternate URL 4 is not unique, the method continues by performing a dictionary lookup of the keywords extracted to form the alternate URL 2. The dictionary lookup may be performed using any existing dictionary technique. Synonyms of the keywords derived from the dictionary are then stemmed and concatenated to form an alternate URL 5 (622). For example, if a synonym of "concert" is "performance," the alternate URL may be "http://ado.be/SanjayRagaPerformanceKritiMelody." The alternate URL 5 is compared to existing URLs (624). If the alternate URL 5 is unique, the alternate URL 5 is returned or otherwise presented to the user (608).

If the alternate URL 5 is not unique, the method continues by generating a random sequence of alphanumeric characters to form an alternate URL 6 (626). For example, the alternate URL may be "http://shost/D08bnD." The alternate URL 6 is then returned or otherwise presented to the user (608). In some cases, if the alternate URL 6 is still not unique, the method continues by forming alternate URL 7 using a unique auto-incremented identification number (e.g., an integer). For example, the identification number may be incremented by one each time this technique is executed (e.g., the alternate URLs may increment from "http://sho.rt/9880" to "http://sho.rt/9881"). The alternate URL 7 is returned or otherwise presented to the user.

According to an embodiment, for content containing Ajax calls, the complete content may not be visible for parsing. An Ajax call is a request used by an asynchronous web application (e.g., an application in which webpage data is generated or otherwise provided separately from the HTML source code for the webpage). With Ajax, web applications can send data to, and retrieve data from, a server asynchronously (e.g., in the background) without interfering with the display and behavior of the existing page. A webpage containing such Ajax calls may therefore not necessarily include all of the content unless and until the Ajax call is executed. However, in these cases, at least the HTML headers will have the required text to be extracted, such as described above with respect to FIG. 6.

Example Computing Device

Figure 9:
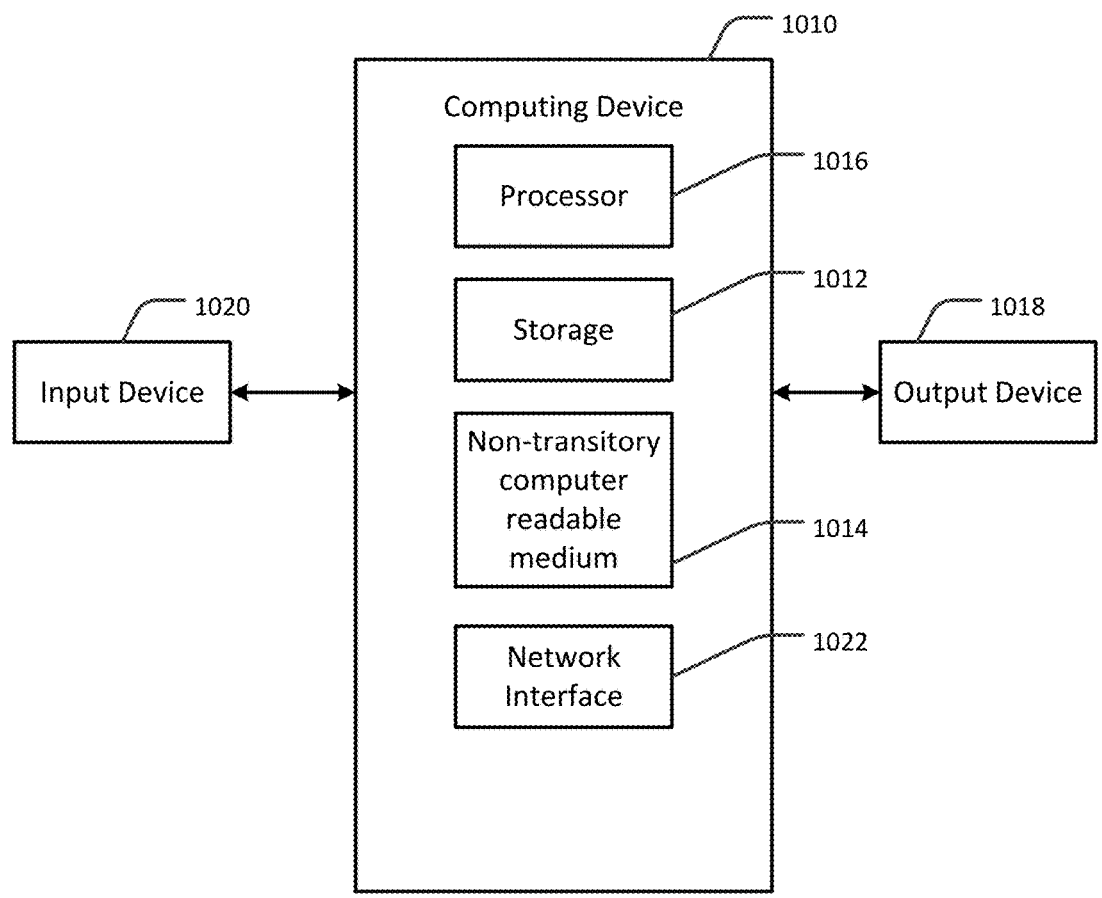
FIG. 9 is a block diagram representing an example computing device that may be used in accordance with an embodiment of the present invention.

FIG. 9 is a block diagram representing an example computing device 1010 that may be used to perform any of the techniques as variously described herein. For example, the computing devices, the web server, or any combination of these (such as described with respect to FIGS. 1*a-b*) may be implemented in the computing device 1010. The computing device 1010 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1010 includes one or more storage devices 1012, non-transitory computer-readable media 1014, or both, having encoded thereon one or more computer-executable instructions or software for implementing techniques as variously described herein. The storage device 1012 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught herein. The storage device 1012 may include other types of memory as well, or combinations thereof. The storage device 1012 may be provided on the computing device or provided separately or remotely from the computing device. The non-transitory computer-readable media 1014 may include, but are not limited to, one or more types of hardware memory, non-transitory tangible media (for example, one or more magnetic storage disks, one or more optical disks, one or more USB flash drives), and the like. The non-transitory computer-readable media 1014 included in the computing device 1010 may store computer-readable and computer-executable instructions or software for implementing various embodiments. The computer-readable media 1014 may be provided on the computing device 1010 or provided separately or remotely from the computing device 1010.

The computing device 1010 also includes at least one processor 1016 for executing computer-readable and computer-executable instructions or software, and other programs for controlling system hardware. The instructions or software can be stored in the storage device 1012, non-transitory computer-readable media 1014, or both. Virtualization may be employed in the computing device 1010 so that infrastructure and resources in the computing device 1010 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1010 through an output device 1018, such as a screen or monitor, which may display one or more user interfaces provided in accordance with some embodiments. The output device 1018 may also display other aspects, elements, information or data associated with some embodiments. The computing device 1010 may include other I/O devices 1020 for receiving input from a user, for example, a keyboard, a joystick, a game controller, a pointing device (e.g., a mouse, a user's finger interfacing directly with a display device, etc.), or any suitable user interface. The computing device 1010 may include other suitable conventional I/O peripherals. The computing device 1010 can include or be operatively coupled to various suitable devices for performing one or more of the functions as variously described herein. The computing device may include a network interface 1022 for communicating with other devices via a network, such as the Internet.

The computing device 1010 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIGS. 1*a-b* and 5, such as the browser and the URL constructor module, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors and databases in different configurations and arrangements, and that the depicted embodiments are not intended to be limiting. Various components of this example embodiment, including the user computing system, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a methodology for automatically constructing a human-friendly and meaningful URL. The method includes receiving a request to construct an alternate uniform resource locator (URL) from an original URL; retrieving web content referenced by the original URL, the web content having at least one keyword encoded therein; parsing the web content for the at least one keyword; automatically constructing the alternate URL to include the at least one keyword; and presenting the alternate URL in response to the request. In some cases, the web content has at least two keywords encoded therein, and the constructing includes concatenating the keywords to form a portion of the alternate URL. In some such cases, the method includes parsing the web content for at least two most frequently occurring keywords in the web content. In some such cases, the constructing includes concatenating the most frequently occurring keywords to form the portion of the alternate URL. In some other such cases, the method includes obtaining a synonym of at least one of the most frequently occurring keywords, wherein the constructing includes using the synonym to form the portion of the alternate URL. In some cases, the constructing includes concatenating the at least one keyword with a domain name of the original URL to form a portion of the alternate URL. In some cases, the keyword is encoded in metadata associated with the web content, and wherein the parsing includes extracting the at least one keyword from the metadata. In some cases, the method includes generating a random sequence of alphanumeric characters, and the constructing includes using the sequence of alphanumeric characters to form a portion of the alternate URL. In some cases, the method includes determining that the alternate URL is unique among a plurality of existing URLs prior to the presenting of the alternate URL.

Another example embodiment provides a system including a storage having at least one memory, and one or more processors each operatively coupled to the storage. The one or more processors are configured to carry out a process including receiving a request to construct an alternate uniform resource locator (URL) from an original URL; retrieving web content referenced by the original URL, the web content having at least one keyword encoded therein; parsing the web content for the at least one keyword; automatically constructing the alternate URL to include the at least one keyword; and presenting the alternate URL in response to the request. In some cases, the web content has at least two keywords encoded therein, and the constructing includes concatenating the keywords to form a portion of the alternate URL. In some such cases, the process includes parsing the web content for at least two most frequently occurring keywords in the web content. In some such cases, the constructing includes concatenating the most frequently occurring keywords to form the portion of the alternate URL. In some other such cases, the process includes obtaining a synonym of at least one of the most frequently occurring keywords, wherein the constructing includes using the synonym to form the portion of the alternate URL. In some cases, the constructing includes concatenating the at least one keyword with a domain name of the original URL to form a portion of the alternate URL. In some cases, the keyword is encoded in metadata associated with the web content, and wherein the parsing includes extracting the at least one keyword from the metadata. In some cases, the process includes generating a random sequence of alphanumeric characters, and the constructing includes using the sequence of alphanumeric characters to form a portion of the alternate URL. In some cases, the process includes determining that the alternate URL is unique among a plurality of existing URLs prior to the presenting of the alternate URL. In some such cases, determining that the alternate URL is unique includes determining that the alternate URL is not identical to any URL registered in a directory service. In some cases, providing the alternate URL includes displaying the alternate URL on a display device, encoding the alternate URL in an email, sending the alternate URL to a destination application, or any combination of these. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising: receiving an original uniform resource locator (URL); retrieving web content referenced by the original URL, the web content including a Hypertext Markup Language (HTML) header field having at least one keyword encoded therein; parsing the web content for the at least one keyword; automatically constructing an alternate URL, the alternate URL including a short domain name and a path portion, wherein the path portion includes the at least one keyword appended to a host domain name, the host domain name being a domain name of a host providing the web content and distinct from the short domain name; and providing the alternate URL.

2. The method of claim 1, wherein the web content has at least two keywords encoded therein, and wherein the constructing includes concatenating the at least two keywords to form a portion of the alternate URL.

3. The method of claim 2, further comprising parsing the web content for at least two most frequently occurring keywords in the web content.

4. The method of claim 3, wherein the constructing includes concatenating the most frequently occurring keywords to form a portion of the alternate URL.

5. The method of claim 3, further comprising obtaining a synonym of at least one of the most frequently occurring keywords, wherein the constructing includes using the synonym to form a portion of the alternate URL.

6. The method of claim 1, wherein the constructing includes concatenating the at least one keyword with a domain name of the original URL to form a portion of the alternate URL.

7. The method of claim 1, wherein the at least one keyword is encoded in metadata associated with the web content, and wherein the parsing includes extracting the at least one keyword from the metadata.

8. The method of claim 1, further comprising generating a random sequence of alphanumeric characters, wherein the constructing includes using the sequence of alphanumeric characters to form a portion of the alternate URL.

9. The method of claim 1, further comprising determining that the alternate URL is unique among a plurality of existing URLs prior to the providing of the alternate URL.

10. The method of claim 9, wherein the determining that the alternate URL is unique includes determining that the alternate URL is not identical to any URL registered in a directory service.

11. The method of claim 1, wherein the providing includes at least one of displaying the alternate URL on a display device, encoding the alternate URL in an email, and sending the alternate URL to a destination application.

12. A system comprising: a storage; and a processor operatively coupled to the storage and configured to execute instruction stored in the storage that when executed cause the processor to carry out a process comprising: receiving an original uniform resource locator (URL); retrieving web content referenced by the original URL, the web content including a Hypertext Markup Language (HTML) header field having at least one keyword encoded therein; parsing the web content for the at least one keyword; automatically constructing an alternate URL, the alternate URL including a short domain name and a path portion, wherein the path portion includes the at least one keyword appended to a host domain name, the host domain name being a domain name of a host providing the web content and distinct from the short domain name; and providing the alternate URL.

13. The system of claim 12, wherein the web content has at least two keywords encoded therein, and wherein the constructing includes concatenating the at least two keywords to form a portion of the alternate URL.

14. The system of claim 13, wherein the process further includes parsing the web content for at least two most frequently occurring keywords in the web content.

15. The system of claim 14, wherein the constructing includes concatenating the most frequently occurring keywords to form a portion of the alternate URL.

16. The system of claim 14, wherein the process further includes obtaining a synonym of at least one of the most frequently occurring keywords, and wherein the constructing includes using the synonym to form a portion of the alternate URL.

17. The system of claim 12, wherein the constructing includes concatenating the at least one keyword with a domain name of the original URL to form a portion of the alternate URL.

18. The system of claim 12, wherein the at least one keyword is encoded in metadata associated with the web content, and wherein the parsing includes extracting the at least one keyword from the metadata.

19. The system of claim 12, wherein the process further includes generating a random sequence of alphanumeric characters, and wherein the constructing includes using the sequence of alphanumeric characters to form a portion of the alternate URL.

20. The system of claim 12, further comprising determining that the alternate URL is unique among a plurality of existing URLs prior to the providing of the alternate URL.

* * * * *